July 3, 1962
G. B. PACKARD
3,042,312
SPRAYING DEVICE
Filed Oct. 14, 1959
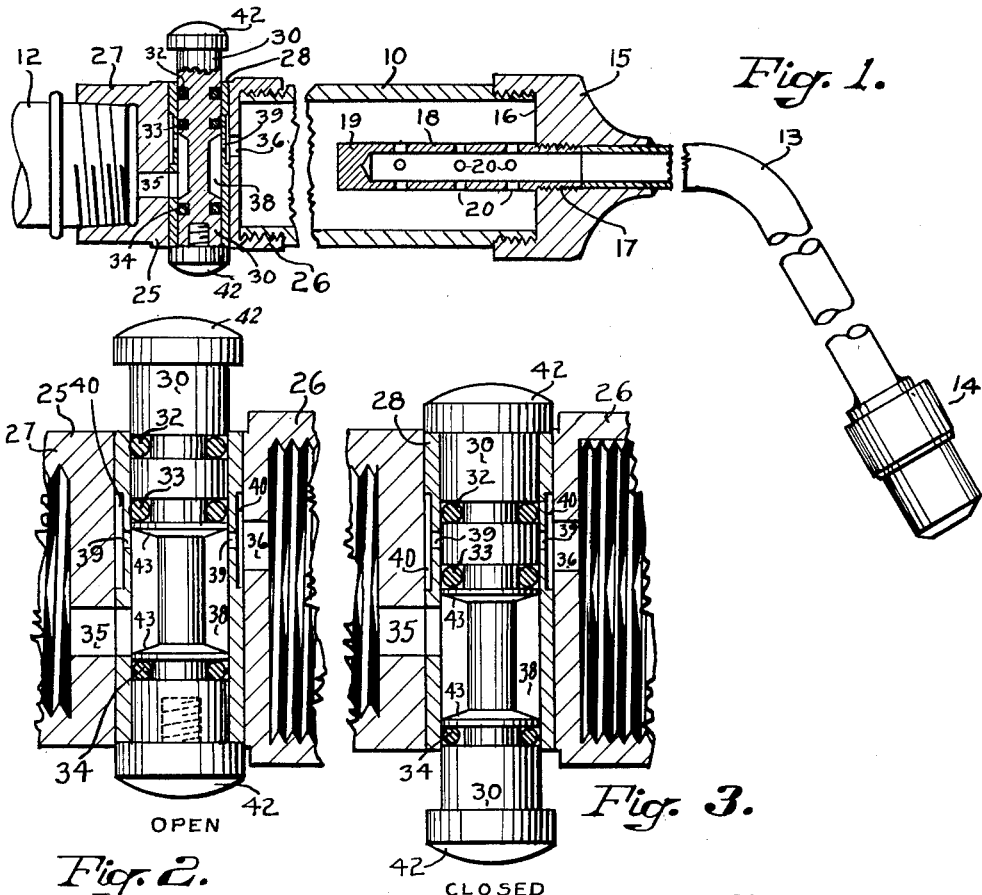
INVENTOR.
George B. Packard
BY
Clayton I. Jenks
ATTORNEY 3,042,312
Patented July 3, 1962

1

3,042,312
SPRAYING DEVICE
George B. Packard, Shrewsbury, Mass., assignor to Barco Manufacturing Co., Inc., Worcester, Mass., a corporation of Massachusetts
Filed Oct. 14, 1959, Ser. No. 846,491
1 Claim. (Cl. 239—315)

This invention relates to a spraying device, and more particularly to a device of the type shown in the U.S. patent to Anderson et al. No. 2,764,452 of September 25, 1956.

A spraying device of this type comprises a barrel or compartment for holding pellets of a chemical, insecticide, fertilizer or other solid water-soluble material. Water under pressure is passed through the compartment and issues from a spraying nozzle for application to the plant or ground. The water is usually derived from a hose attached to a valved faucet or other source, and the operator is required to drag the hose into required positions and to apply the spray carefully so as not to strike areas to be left untouched. Hence, it is desirable that the device be completely manipulatable by one hand and that the valve be so located and constructed that it may be quickly and easily operated to control the fluid flow so as to limit the area of application. It is also desirable to provide the device with a nozzle which may be readily adjusted to give either a fine mist or a coarse spray for application to nearby areas or to provide a type of stream which will serve for applying the spray material in the tops of trees or remote areas.

The primary objects of this invention are to satisfy such requirements and to provide a spraying device which may be readily held in and controlled by one hand and wherein the valve is of such construction and location that the fluid flow may be quickly and easily stopped. Another object is to provide a device of this type wherein the valve body and the movable stem are so constructed that the valve may be manipulated repeatedly and for a long period of usage without excessive wear of the movable valve seal by its passing across an orifice in the valve casing.

A further object is to provide a device of this type with a nozzle which has an adjustable part so arranged that by a simple manual operation the spray may be readily changed from a coarse to a fine one and the quantity of issuing liquid may be varied.

A further object is to provide a nozzle for such a device which is so constructed that the mist spraying elements may be readily removed, and wherein the remaining parts are so constructed that a fine stream may be produced for reaching distant locations. Other objects will be readily apparent in the following disclosure.

Referring to the drawings illustrating a preferred embodiment of the invention:

FIG. 1 is a longitudinal sectional view of the device, partly in full and broken away;

FIG. 2 is an enlarged sectional view of the water-controlling valve in an open position;

FIG. 3 is a similar view of the valve when closed; and

FIG. 4 is an enlarged sectional view of the nozzle in its mist-producing adjustment.

The construction illustrated comprises a compartment 10 shown as a cylindrical tube of a material which is at least partially transparent or translucent and is preferably made of glass or a plastic, such as polyethylene, slightly tinted to provide a satisfactory view of its contents. This compartment 10 is adapted to contain pellets or other solid shape of a suitable water-soluble material. Water under pressure is introduced to this tube 10 by means of a hose pipe 12 adapted to be connected to a house or other suitable outside pipe or faucet. The water passing through the tube 10 dissolves the pellet material, and the solution is transported through a tube 13 of suitable shape to a nozzle 14 as will be defined. The tube 13 may be inserted at its inner left hand end (FIG. 1) in a central hole in the metal cap 15, and the latter has a recess 16 within which an adjacent end of the tube 10 is threaded or suitably secured. The cap has an internal thread 17 within which is threaded a self-cleaning tube 18 arranged to project into the end portion of tube 10 axially and centrally thereof. The tube 18 may be closed at its inner end 19 and it is provided with a series of small holes 20 through which the aqueous solution is introduced to the nozzle tube 13. The holes 20 are so sized as to prevent the pellets escaping therethrough. The threaded joints provide for complete removability and cleaning of the apparatus, but other suitable fastening means may be provided as desired. At the other end of the tube 10 is a hollow valve casing 25 which has a suitable recessed threaded coupling 26 arranged to be suitably connected to a threaded end of the tube 10. At the left hand end, the casing has a recessed internally threaded cap 27 into which a threaded coupling on the hose 12 is secured. Washers are, of course, suitably provided where needed.

According to one embodiment of this invention, the casing 25 is provided with a transverse cylindrical hole, shown in a vertical arrangement in the drawings as extending at right angles to the axis of the tube 10, and that hole has a hollow valve sleeve 28 fitted therein. A valve stem 30 has two cylindrical end portions slidably mounted in the sleeve. The stem fits only loosely in the sleeve and it rides on O-rings 32, 33 and 34 which engage the internal highly polished cylindrical surface of the sleeve 28. These rings are retained in annular recesses milled in the periphery of the cylindrical stem 30, as shown, and each interfits with the bottom of the recess and the polished wall of the sleeve to make a tight seal for preventing the escape of water as well as to serve as a sliding bearing for the valve stem.

The valve casing 25 has two holes 35 and 36 communicating with opposite sides of the interior of the slide valve compartment which are out of alignment as shown in the drawings. The hole 35 communicates with the hose pipe 12 and the hole 36 with the tube 10. The valve stem is cut away to provide an annular chamber 38 between the sleeve and the casing, and the length of that chamber is such, as shown in FIG. 2, as to provide a communicating passage from the inlet opening 35 to the exit opening 36. When the valve is in the open position of FIG. 2, water may flow through a hole 29 into that annular space 38 around the reduced portion of the valve stem and then may escape through a series of annularly arranged holes 39 (FIG. 2) in the sleeve 28 and thence into an annular chamber 40 formed by milling away the outer surface portion of the sleeve, as shown. That chamber communicates with the opening 36 at the right hand side of the valve casing. As shown, the holes 39 are small in diameter as compared with the size of the port 36, so that the adjacent O-ring 33 may ride over these small holes without being cut or otherwise damaged materially by the edges of the holes, as compared with the action if the O-ring had to pass directly across the large porthole 36. Hence, the plurality of small holes which are sized to supply the port 36 provide a material advantage over a construction devoid of the sleeve within which the O-rings slide. The recess 40 and the annular band of radial holes 39 in the sleeve 28 form unobstructed and adequate inlet passages which will carry water without material back resistance from the chamber 38 to the outlet port 36 when the valve is in an open position. The valve stem 28 may be provided with two end buttons 42 which have stems suitably threaded into the end of the valve stem 30 and are extended outwardly beyond the periphery of the valve stem so as to engage the ends of the sleeve and thus limit the sliding movement of the valve stem.

It will now be seen that when the stem is in the position of FIG. 2, the water may flow from the inlet opening 35 to the outlet opening 36 through the annular spaces 38 and 40, as above described. When it is desired to stop the water flow, it is merely required to push downwardly on the upper end cap 42 (FIG. 2) and move the valve stem to the position of FIG. 3. When in this position, the O-ring 33 has moved downwardly past the openings 39 and so prevents communication with the annular chamber 40 and therefore keeps the water from reaching the outlet passage 36. The O-rings 33 and 34 seal the water entrance end of the annular chamber 38 and the flow of water is effectively stopped. It will be noted that the water pressure is balanced against the equal area piston surfaces 43 on the valve stem at the ends of the annular chamber 38 so that the valve will stay in either an open or a closed position to which it has been moved by the operator. The O-rings 33 and 34 are inserted in grooves in the stem immediately outside of the balancing piston surfaces 43 and may be considered as parts of the piston. The rings 32 and 33 may move to a closed valve position where they are located on opposite sides of the radial holes 39, but only the ring 33 will pass over these holes during operation of the valve stem. The rings 32 and 34 will always ride on the interior cylindrical surface of the sleeve 28. Since the operator can grasp the substantially cylindrical parts of the valve casing 25 and tube 10 with one hand, the end button 42 of the valve stem is readily available for quick operation by finger movement.

A further feature of the invention relates to the nozzle 14 which is so constructed that one may obtain either a fine mist or a coarse spray or a direct stream. As shown particularly in the enlarged view of the embodiment of FIG. 4, the nozzle comprises a ring-shaped body 50 which has a central hole within which the right hand end of the tube 13 is fitted. A suitable solder or resin cement may be applied at 52 to insure a tight connection between the parts, or they may be otherwise suitably connected. This body 50 has external and internal threads, as shown. A hollow nozzle cap 54 has an enlarged end internally threaded and adjustably mounted on the external threads 55 of the body ring 50. This cap has a reduced cylindrical portion 56 terminating in a front end wall 57 which is provided with a small spray opening 58 arranged axially of the tube 13.

An inner nozzle element or body 60 is shaped to be removably introduced within the hollow cap 54. It has external threads 62 on a rear reduced end portion which ride on the internal threads of the body 50, and the space within the outer annular nozzle portion 56 is such that the cap 54 may be adjustably turned on the threads 55 to move the outer end wall 57 of the nozzle toward and from the end wall 64 of the inner nozzle element 60. This nozzle body or element 60 has a central bore 65 which communicates with the space 67 between the element 60 and the body part 56 only through radially arranged openings 66. The end of the nozzle body 60 is closed at 64 so that water can escape from the tube 13 only through the bore 65 and the radial passages 66 to the space 67 between the walls 64 and 57. The outer end 64 of the nozzle body 60 may be suitably recessed at its end, as shown. It is provided with two or more short narrow slots 68 arranged obliquely relative to the nozzle axis which are so located and shaped that when the inner conical surface of the cap end 57 has been screwed up into tight engagement with the similarly shaped conical end 69 of the nozzle body 60, then water can escape only through these slots. The angularity of the slots is such that the water is given a swirling or rotary motion as it escapes therethrough to the nozzle opening 58. This produces a very fine mist. Each slot 68 has its size calibrated in accordance with the spray requirements. If the nozzle cap is moved outwardly so that water can escape through the annular passage between the inner nozzle 60 and the wall 57, then a spray of coarse water drops is developed, and the coarseness will depend upon the relative axial adjustment of the cap 54 and the nozzle body 60. The nozzle body 60 has an external annular groove, as shown, within which is mounted an O-ring 70 fitting against the inner cylindrical surface of the portion 56 of the outer nozzle cap. An elastic washer 71 lies between a rear shoulder of the body 60 and the body ring 50, and it is so shaped and arranged that when the part 60 is screwed into place, the washer 71 forms a seal at this point to prevent leakage of the water through the threads 55.

To provide a long stream of water, the nozzle body 60 and the exterior nozzle cap are removable. Consequently, a straight stream of water may be directed outwardly from the end of the tube 13. In order to provide a small diameter stream of high velocity, a ring 75 is threaded into the body 50 behind the nozzle portion 60 and it is provided with a small axial orifice so that when the cap has been removed, a straight stream may be thrown therethrough. The size and length of the inner cylindrical bore of the ring 75 is determined in accordance with the water pressure and the requirements. It will be observed that these various nozzle parts are removable and easily dis-assembled so that any required cleansing operation may be readily effected.

It will now be appreciated that I have provided a spray nozzle having a tube arranged for carrying a solid spray material to be dissolved by the water passing therearound and which has a valve arranged closely adjacent to that tube and in such a position that the tube may be carried in one hand and the valve manipulated by a finger of the same hand while the operator's other hand is employed in supporting the hose pipe 12 to which the spray nozzle is connected. The slide valve 30 is movable easily in either direction to start and stop the water flow by a comparatively gentle pressure thereagainst from a single finger of the hand holding the nozzle body. Since the valve stem is balanced against the water pressure at all times, but little effort is required to move the valve stem, and this merely to overcome the friction of the O-rings against the sleeve 28 which provide the wall support for the valve stem. The slide valve 30 is arranged to move transversely of the axis of the tube 10 so that the tube may be carried in one hand and the valve may be operated by a single finger, whereas, if the valve were otherwise arranged, such as shown in said patent, it requires a two hand operation, and this is not always convenient when one hand is required for transporting and holding the hose pipe 12. It will also be observed that tube 10, which is very long compared with its diameter, may be readily removed at either end by merely unscrewing the attached part, so that the pellet contents of the tube may be replenished whenever needed. At this time the filter element 18 may be unscrewed from the cap 15 to permit cleaning that tube shape.

When the entire assembly of FIG. 4 is present, then either a fine mist or a coarse spray may be obtained by a quick rotatable adjustment of the cap 54 along the threads of the ring body 50. Moving the cap toward the inner nozzle 64 decreases the volume of the water issuing from the nozzle and at the same time increases the fineness of the water droplets, so that when the cap wall 57 contacts the similarly shaped annular wall of the nozzle 64, then water is prevented from flowing through that space and is required to pass entirely through the slots 68. These slots are arranged obliquely so that they cause the water to whirl, and this aids in producing the fine conical shaped spray mist issuing from the orifice 58. If it is desired to apply a spray to the top of an apple tree, for example, and which cannot be reached by the mist, then it is a simple operation to unscrew the cap 54 and the inner nozzle body 60 from the body 50 which is permanently attached to the tube 13 and thus allow the water to issue directly as a solid stream. Although I have shown the ring 75 in place behind the nozzle element 60 (FIG. 4), yet the ring may be removed, if desired, for the mist-producing operation. The ring member 75 threaded into the body 50 has its bore of such diameter that in accordance with the water pressure a stream of desired diameter and length may be obtained within the permitted requirements. To obtain a different sized spray stream one may provide two or more rings 75 having different sized internal bores so that a ring may be selected which meets the needs of the occasion. Various other advantages will be readily apparent.

Having thus described this invention, it is to be understood that the above disclosure and the drawings are to be interpreted as illustrating the principles of the invention and a preferred embodiment thereof and not as imposing limitations on the appended claim.

I claim:

In a spraying apparatus comprising a conduit for introducing water under pressure, a chemical pellet container forming a continuation of said conduit, a spray nozzle operatively connected to said pellet container and a valve interposed in said conduit for controlling the flow of water therethrough, that improvement in which said valve comprises a hollow casing having oppositely disposed threaded ends and a passage therebetween providing inlet and outlet ports connected respectively to said conduit and to said pellet container, said casing having a cylindrical bore intersecting said passage and extending transversely thereof and opening outwardly at the opposite sides of said casing, a stationary sleeve fitted within said bore, said sleeve having a cylindrical inner surface forming the side wall of the valve chamber, a valve stem which is longer than said sleeve mounted to slide endwise within said sleeve, said stem having manually engageable buttons projecting exteriorly of said casing at both ends of said sleeve for moving said stem endwise within said sleeve, said sleeve and said casing providing an annular space which is opposite to and communicates with said outlet port, said stem having a reduced portion which with said sleeve forms an annular recess within said valve chamber, said sleeve having an opening connecting said annular recess with said inlet port, said sleeve having also an annular band of holes spaced from said opening longitudinally of said sleeve which are located opposite to said annular space and are adapted to connect said annular recess through said annular space to said outlet port, said valve stem being provided with spaced equal area balancing pistons on the opposite ends thereof the inner end surfaces of which define the ends of said annular recess, a peripheral seat ring groove around the piston which is adjacent to said inlet port, a seat ring in said groove, two spaced apart seat ring grooves around the piston which is adjacent said outlet port, seat rings in each of the last named grooves, said seat rings being so positioned along said valve stem that in one endwise position of said valve stem both said inlet and outlet ports are in communication with said annular recess and in the other endwise position of said valve stem said inlet port is in communication with said annular recess while said outlet port is cut off from said annular recess by that portion of said piston having said two spaced apart seat rings which is between said two spaced apart seat rings covering said annular band of holes in said sleeve, the holes of said band of holes being of less diameter than the diameter of the cross section of the seat ring which moves over said holes when said valve stem is moved endwise in said sleeve.

References Cited in the file of this patent

UNITED STATES PATENTS

| | | |
|---|---|---|
| 2,517,061 | Von Stackelberg | Aug. 1, 1950 |
| 2,761,735 | Berghoff | Sept. 4, 1956 |
| 2,764,452 | Anderson et al. | Sept. 25, 1956 |
| 2,785,926 | Lataste | Mar. 19, 1957 |
| 2,797,132 | Alpert | June 25, 1957 |
| 2,910,081 | Karbowniczek | Oct. 27, 1959 |

FOREIGN PATENTS

| | | |
|---|---|---|
| 192,340 | Germany | Oct. 10, 1957 |
| 1,060,407 | France | Nov. 18, 1953 |
| 1,138,359 | France | Jan. 28, 1957 |